United States Patent
Tamura et al.

(10) Patent No.: US 8,069,361 B2
(45) Date of Patent: Nov. 29, 2011

(54) METHOD AND PROGRAM FOR SETTING MICROPROCESSOR POWER SUPPLY VOLTAGE

(75) Inventors: Tetsuji Tamura, Tokyo (JP); Iwao Takiguchi, Kanagawa (JP); Yosuke Muraki, Tokyo (JP); Toshiyuki Hiroi, Saitama (JP); Koji Inoue, Tokyo (JP); Makoto Aikawa, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 538 days.

(21) Appl. No.: 12/162,393

(22) PCT Filed: Nov. 20, 2006

(86) PCT No.: PCT/JP2006/323107
§ 371 (c)(1),
(2), (4) Date: Nov. 4, 2008

(87) PCT Pub. No.: WO2007/091361
PCT Pub. Date: Aug. 16, 2007

(65) Prior Publication Data
US 2009/0228727 A1    Sep. 10, 2009

(30) Foreign Application Priority Data
Feb. 10, 2006   (JP) ................................. 2006-033968

(51) Int. Cl.
*G06F 1/32*   (2006.01)
(52) U.S. Cl. ...................................... 713/323; 713/320
(58) Field of Classification Search .................. 713/320, 713/323
See application file for complete search history.

(56) References Cited

U.S. PATENT DOCUMENTS

| | | | |
|---|---|---|---|
| 6,795,927 B1 * | 9/2004 | Altmejd et al. | 713/300 |
| 2003/0065497 A1 * | 4/2003 | Rhoads | 703/18 |
| 2005/0289376 A1 * | 12/2005 | Hartman et al. | 713/320 |

FOREIGN PATENT DOCUMENTS

| | | |
|---|---|---|
| JP | 02-199851 A | 8/1990 |
| JP | 6334585 A | 12/1994 |
| JP | 11-203163 A | 7/1999 |
| JP | 11203163 A | 7/1999 |
| JP | 2003-256069 A | 9/2003 |
| JP | 2005-134531 A | 5/2005 |
| JP | 2006-004338 A | 1/2006 |

(Continued)

OTHER PUBLICATIONS

Machine English translation of JP 11- 203163 A (1999) [original cited by applicant]; pub. date Jul. 30, 1999.*

(Continued)

*Primary Examiner* — Glenn A Auve
(74) *Attorney, Agent, or Firm* — Matthew B. Dernier, Esq.; Gibson & Dernier LLP (57) ABSTRACT

A determining unit determines the state of the microprocessor. A setting unit sets a power supply voltage to be supplied to the microprocessor according to the state of the microprocessor determined by the determining unit. A power supply circuit supplies the power supply voltage set by the setting unit, to the microprocessor via a power supply line. The determining unit determines repeatedly the state of the microprocessor at preset timing, and the setting unit resets the power supply voltage every time the determination is performed by the determining unit.

16 Claims, 7 Drawing Sheets

FOREIGN PATENT DOCUMENTS

| | | |
|---|---|---|
| JP | 2006-332131 A | 12/2006 |
| WO | 2005008777 A1 | 1/2005 |

OTHER PUBLICATIONS

International Search Report for corresponding PCT application PCT/JP2006/323107.
International Preliminary Report on Patentability for corresponding PCT application PCT/JP2006/323107.
Written Opinion for for corresponding PCT application PCT/JP2006/323107.
Japanese Office Action for corresponding Japanese Application No. 2006-033968, Sep. 14, 2010.
Japanese Office Action for corresponding Japanese Application No. 2006-033968, Jul. 6, 2010.
Chinese Office Action for corresponding Chinese Application No. 2006-80051222, Jan. 11, 2011.
Japanese Office Action for corresponding Japanese Application No. 2006-033968, Mar. 15, 2011.

* cited by examiner

Prior Art

METHOD AND PROGRAM FOR SETTING MICROPROCESSOR POWER SUPPLY VOLTAGE

BACKGROUND OF THE INVENTION

The present invention relates to a technology for
1. Field of the Invention setting a power supply voltage to be supplied to a microprocessor such as a CPU.
2. Description of the Related Art A predetermined power supply voltage stabilized by a voltage regulator circuit (hereinafter referred to simply as "regulator circuit" also) is supplied to a microprocessor, such as a CPU, used in a personal computer, workstation, game device, or the like. The power supply voltage to be supplied to a microprocessor is set in accordance with a semiconductor fabrication process or the like employed for the microprocessor, and it is about 1.2 V for microprocessors fabricated by a low-voltage process of recent years.

Figure 8:
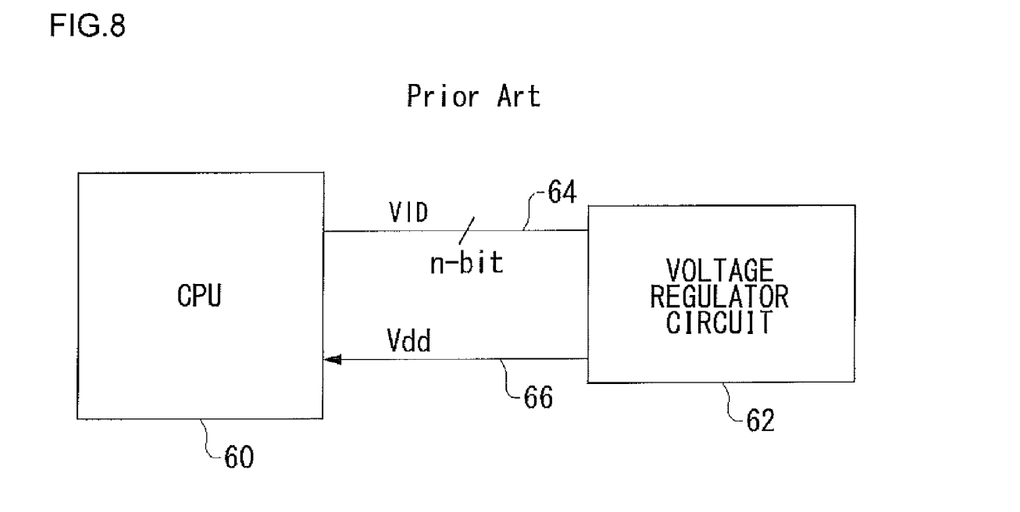
FIG. 8 is a block diagram showing an example of a conventional configuration of a microprocessor and a regulator circuit.

Today a variety of microprocessors are being supplied by a plurality of vendors. The microprocessors supplied by the respective vendors specify power supply voltages to be supplied to themselves in their own schemes by the regulator circuits. In other words, the regulator circuits are designed such that they can accept the specification of a power supply voltage from a microprocessor. FIG. 8 is a block diagram showing an example of a conventional configuration of a microprocessor and a regulator circuit.

As shown in FIG. 8, a microprocessor 60 and a regulator 62 are parallely connected by a signal line 64 of 5 bits, for instance. The microprocessor 60 specifies a power supply voltage Vdd to be supplied to itself to the regulator circuit 62 by transmitting a VID (Voltage ID) signal through the signal line 64. The regulator circuit 62 produces the power supply voltage Vdd specified by the microprocessor 60 and supplies it to the microprocessor 60 through a power supply line 66. With such a configuration implemented, even when a user replaces the microprocessor 60 with another microprocessor 60, for instance, after the shipment of a device equipped with the microprocessor 60 and the regulator circuit 62 (hereinafter referred to simply as "set" also), an optimum power supply voltage Vdd can be supplied to the microprocessor 60 after the replacement.

DISCLOSURE OF THE INVENTION

Problems to be Solved by the Invention

However, in conventional art, the VID of a microprocessor 60, once set for instance at the time of fabrication of a set equipped with the microprocessor, is never changed thereafter. Therefore, the power supply voltage supplied to the microprocessor remains constant irrespective of the hours of use after shipment from the factory, for instance.

Under such circumstances, the vendors producing microprocessors have set the power supply voltage, or the VID, by allowing a margin based on the worst assumed conditions taking into consideration the deterioration with time and the operating frequency of the microprocessor as well as the voltage drop and operating temperature expected of the set equipped with the microprocessor. What is meant by this is that, to begin with, a power supply voltage higher than necessary to operate a microprocessor is supplied to the microprocessor. In other words, if an optimum power supply voltage can be set in response to the condition of a microprocessor, then it is possible to reduce the power consumption of the microprocessor.

The present invention has been made in view of these problems, and one of the objectives thereof is to provide a technology for optimizing a power supply voltage to be supplied to a microprocessor.

One embodiment of the present invention to resolve the foregoing problems relates to a method for setting a power supply voltage to be supplied to a microprocessor or an arithmetic processor utilizing the setting method. In this technology, the following processes are performed:

(1) Determining the state of a microprocessor.

The "state of a microprocessor" means the performance (minimum voltage for operating the microprocessor), cumulative operating time, operating frequency, operating temperature, characteristics varying from other individual units, and the like of the microprocessor, and further includes the impedance of the power supply line and the like of a device equipped therewith. It is a wide concept encompassing the states that can affect the operating voltage of the microprocessor.

(2) Setting a power supply voltage to be supplied to the microprocessor according to the state of the microprocessor as determined in (1).

(3) Carrying out the two processes of (1) and (2) above at least once with the microprocessor mounted on an electronic device which is to be finally equipped therewith and the electronic device performing all its functions.

According to this embodiment, an optimum power supply voltage can be set for an individual microprocessor and an individual device equipped therewith under actual operating conditions of the microprocessor.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The technical ideas underlying the present invention are realized by a variety of embodiments as will be described hereinbelow. Firstly, those embodiments will be outlined.

One embodiment of the present invention relates to a method for setting a power supply voltage to be supplied to a microprocessor. This method comprises: determining a state of a microprocessor; and setting the power supply voltage according to the state determined by the determining. In this method, the determining and the setting are carried out with the microprocessor mounted on an electronic device.

The determining may be performed repeatedly in predetermined timing, and whenever the determining is performed, the power supply voltage may be reset by the setting. An optimum power supply voltage at any given time can be set by resetting the power supply voltage in predetermined timing such as at power-on of the electronic device or at predetermined hours.

Determination of the state of a microprocessor and setting of a power supply voltage are accomplished for instance in embodiments as described below.

(Setting Method 1)

In the determining, a predetermined determination program is executed using a microprocessor. In the setting, a power supply voltage is set based on a result of execution of the determination program in the determining. This determination program may include a processing code that sets a maximum power supply voltage necessary for the microprocessor.

In such a case, the determining may be such that the power supply voltage supplied to the microprocessor is lowered successively as a predetermined processing is executed by the microprocessor. The setting may detect a voltage near the lower limit for the operation of the microprocessor and may set the detected voltage as the power supply voltage.

When the power supply voltage is lowered gradually, the microprocessor cannot execute predetermined processings at a certain voltage and below. Therefore, a lower limit voltage at which the microprocessor can still be operated is estimated, and the estimated voltage is set as the power supply voltage. According to this method, an optimum voltage setting can be accomplished in response to the state of the microprocessor when the determining is performed.

A determination program may be updated by an updating after the shipment of an electronic device equipped with the microprocessor.

(Setting Method 2)

In the determining, a characteristic that can be an indicator of the lower limit of operating voltage of the microprocessor is measured. For example, the characteristic that can be an indicator is the oscillation frequency of a ring oscillator provided within the microprocessor. The oscillation frequency of a ring oscillator is an indicator of the performance of transistor gates of a microprocessor, and the higher the oscillation frequency is, the lower the lower limit of the operating voltage will be. In this case, the oscillation frequency of the ring oscillator may be measured by a frequency measuring, and a power supply voltage may be set in the setting based on the frequency measured in the frequency measuring.

The determining may include measuring a cumulative operating time (hereinafter referred to as "ON time" also) of the microprocessor. The setting may set the power supply voltage according to the cumulative operating time measured by the measuring. The performance of transistor gates of a microprocessor deteriorates with time by the effect of migration and the like, so that the minimum operating voltage rises with time. Thus, by measuring the cumulative operating time of a microprocessor, it is possible to set a power supply voltage with deterioration with time taken into consideration.

Another embodiment of the present invention relates to an arithmetic processor. The arithmetic processor comprises: a microprocessor; a determining unit which determines the state of the microprocessor; a setting unit which sets a power supply voltage to be supplied to the microprocessor according to the state of the microprocessor determined by the determining unit; and a power supply circuit which supplies the power supply voltage set by the setting unit to the microprocessor.

Optional combinations of the aforementioned constituting elements, and implementations of the invention in the form of methods, apparatuses, systems and so forth may also be effective as additional modes of the present invention.

An arithmetic processor according to embodiments of the present invention will now be described in detail by reference to the drawings.

Figure 1:
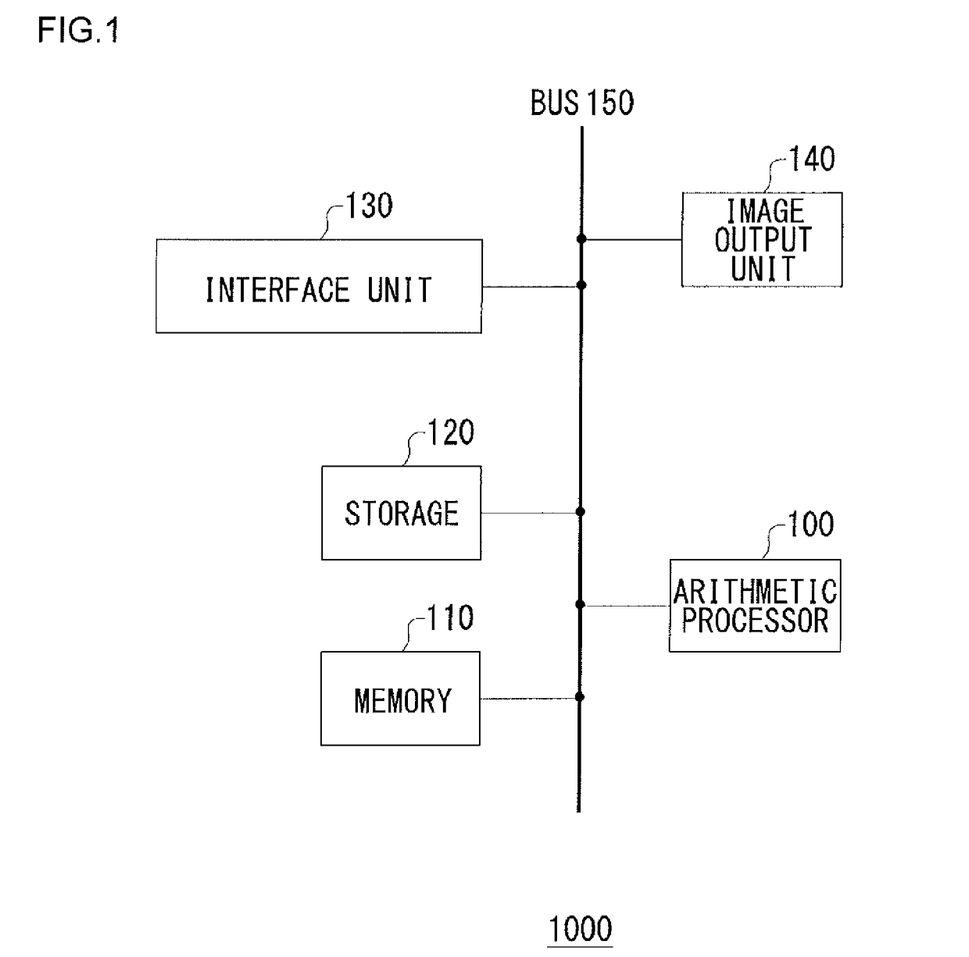
FIG. 1 is a block diagram showing a structure of an electronic device according to an embodiment.

FIG. 1 is a block diagram showing a structure of an electronic device 1000 according to an embodiment. The electronic device 1000 may be a game device, a personal computer, a workstation, a PDA, or the like. The following description covers a case of the electronic device 1000 being a game device, which, however, does not intend to limit the scope of the present invention but exemplifies the invention.

This electronic device 1000 includes an arithmetic processor 100, a memory 110, a recording unit 120, an interface unit 130, an image output unit 140, a bus 150, and so forth.

The arithmetic processor 100, which is a unit including for instance a CPU or a graphic processor, carries out predetermined digital arithmetic processings. The CPU is a unit for managing the electronic device 1000 in an integrated manner. The graphic processor is an LSI so designed as to specialize in image processings. The functions of a CPU and a graphic processor may be effectuated by a single LSI. Image data generated by the graphic processor are outputted to an external image display unit (not shown) through the image output unit 140. The arithmetic processor 100 performs arithmetic processings by loading a program or data from the recording unit 120 to the memory 110.

The recording unit 120, which is a hard disk or DVD device, stores programs and the like that are executed by the electronic device. The interface unit 130, which is a USB port, modem, wireless LAN (Local Area Network) or such other unit, is used to connect the electronic device to an external network such as an external device or the Internet. The respective blocks are interconnected by the bus 150.

The arithmetic processor 100 according to the present embodiment can be used in an electronic device 1000 as described above and, in particular, can be suitably used in ones with large power consumption. The arithmetic processor 100 will now be described in detail.

Figure 2:
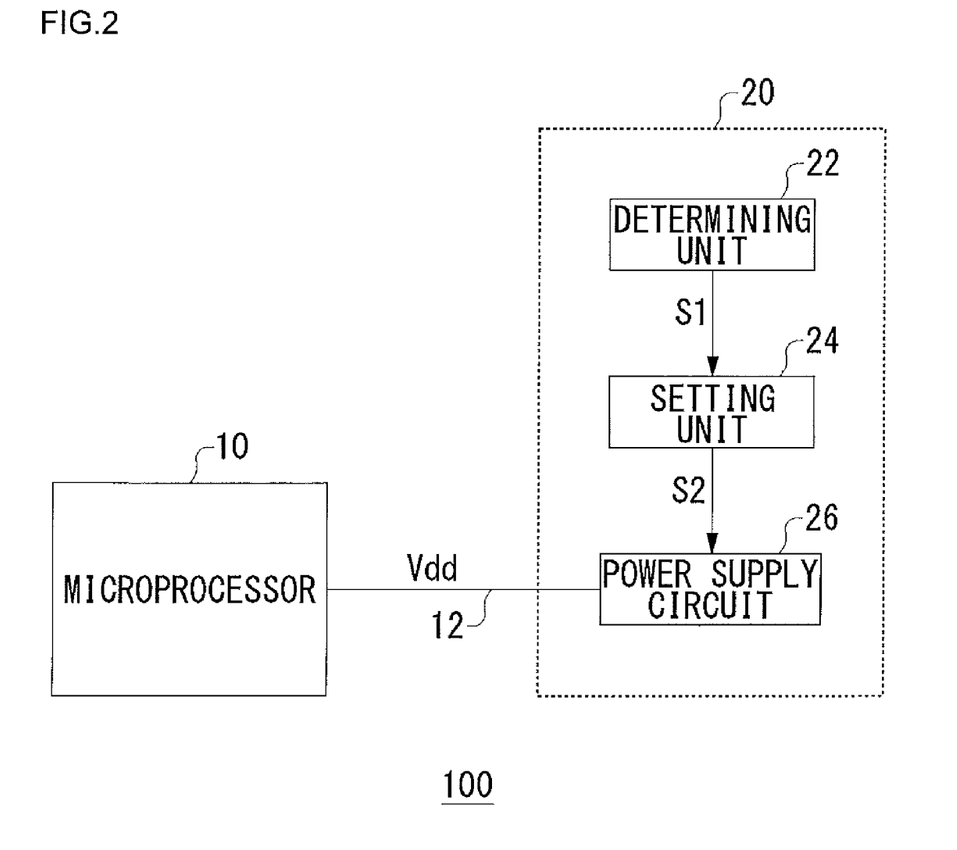
FIG. 2 is a block diagram showing a structure of an arithmetic processor according to an embodiment.

FIG. 2 is a block diagram showing a structure of an arithmetic processor 100 according to the embodiment. The arithmetic processor 100 includes a microprocessor 10, such as a CPU or a graphic processor, and a power supply unit 20 for supplying a power supply voltage Vdd to the microprocessor 10. Here, each block has been separated from one another for convenience to facilitate understanding the present invention. Hence, each element shown in Figure and described as a functional block for performing various processings may be implemented hardwarewise by a CPU, memory and other LSIs, and softwarewise by memory-loaded programs or the like. Therefore, it is understood by those skilled in the art that the functional blocks may be implemented by a variety of manners including hardware only, software only or a combination of both, and are not limited to any particular one.

The microprocessor 10 and the power supply unit 20 are connected to each other via a power supply line 12. Note that the identical or equivalent components in the following figures will be given the identical reference numerals and the repeated description thereof will be omitted as appropriate. The microprocessor 10 driven by the power supply unit 20 typically operates on a power supply voltage that is about 1.2 V. In point of fact, however, an optimum power supply voltage Vdd changes depending on various factors such as the actual arithmetic processing to be executed, the temperature of the microprocessor 10 or the lapse of time from mounting the processor. Hence, the arithmetic processor 100 according to the present embodiment determines the state of the microprocessor 10 and sets dynamically or statically the power supply voltage to be supplied to the microprocessor 10 based on the result of the determination.

The power supply unit 20 includes a determining unit 22, a setting unit 24, and a power supply circuit 26. The determining unit 22 determines the state of the microprocessor 10. The determining unit 22 sends a control signal S1 indicative of the state of the microprocessor 10 derived as a result of the determination to the setting unit 24. By referring to the control signal S1, the setting unit 24 sets a power supply voltage Vdd to be supplied to the microprocessor 10 according to the state of the microprocessor 10 as determined by the determining unit 22. The setting unit 24 sends a control signal S2 indicative of the power supply voltage Vdd thus set to the power supply circuit 26. The power supply circuit 26, which is a regulator circuit or the like, supplies the power supply voltage Vdd set by the setting unit 24 to the microprocessor 10.

The functions of the determining unit 22 and the setting unit 24 may be carried out by hardware such as a system controller, and also part of the functions may be carried out by a program that is executed by the microprocessor 10.

As described above, the arithmetic processor 100 and the method for setting the power supply voltage according to the present embodiment are such that a power supply voltage is set after the arithmetic processor 100 including the microprocessor 10 is installed in the electronic device 1000. As a result, an optimum power supply voltage can be set for an individual microprocessor and an individual device equipped therewith under actual operating conditions of the microprocessor.

Described hereinbelow will be preferable concrete examples of determining the state of the microprocessor 10 and setting the power supply voltage Vdd by the determining unit 22 and the setting unit 24.

(First Method of Setting)

Figure 3:
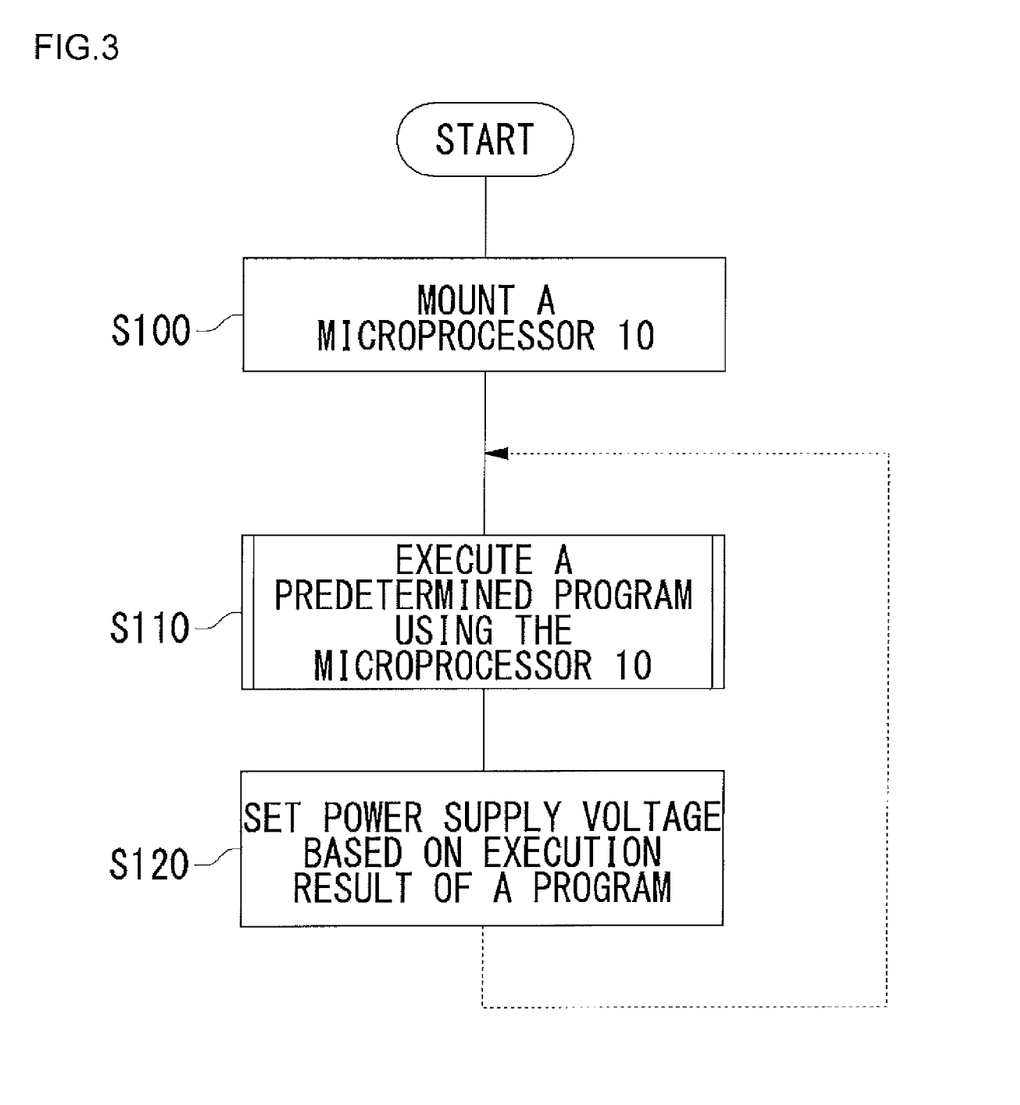
FIG. 3 is a flowchart showing a first method for setting a power supply voltage in an arithmetic processor of FIG. 1.

FIG. 3 is a flowchart showing a first method for setting a power supply voltage in an arithmetic processor 100 of FIG. 1. In a mounting step S100, which is a manufacturing process of an electronic device 1000, an arithmetic processor 100, including a microprocessor 10, is mounted on the electronic device 1000.

After the mounting step S100, a determining step S110 and a setting step S120 are performed successively. In the determining step S110, a predetermined determination program is executed using the microprocessor 10 to which a voltage is supplied. In the setting step S120, a power supply voltage Vdd is set based on the result of execution of the determination program in the determining step S110. The setting step S130 is performed by the setting unit 24.

The determining step S110 and the setting step S120 correspond to the functions of the determining unit 22 and the setting unit 24, respectively. The two steps of the determining step S110 and the setting step S120 are performed in a state where the arithmetic processor 100 including the microprocessor 10 is mounted on the electronic device 1000.

After the start of use of the microprocessor 10, the determining step S110 may be performed repeatedly in predetermined timing. The predetermined timing means the time of starting up the electronic device 1000, the hour in the night when the user is not using the electronic device 1000, the hour specified by the user in advance, and the like. In such a case, whenever the determining step S110 is performed, the power supply voltage Vdd is reset by the setting step S120. By performing the determining step S110 repeatedly in predetermined timing, an optimum power supply voltage can be set at any given time.

Figure 4:
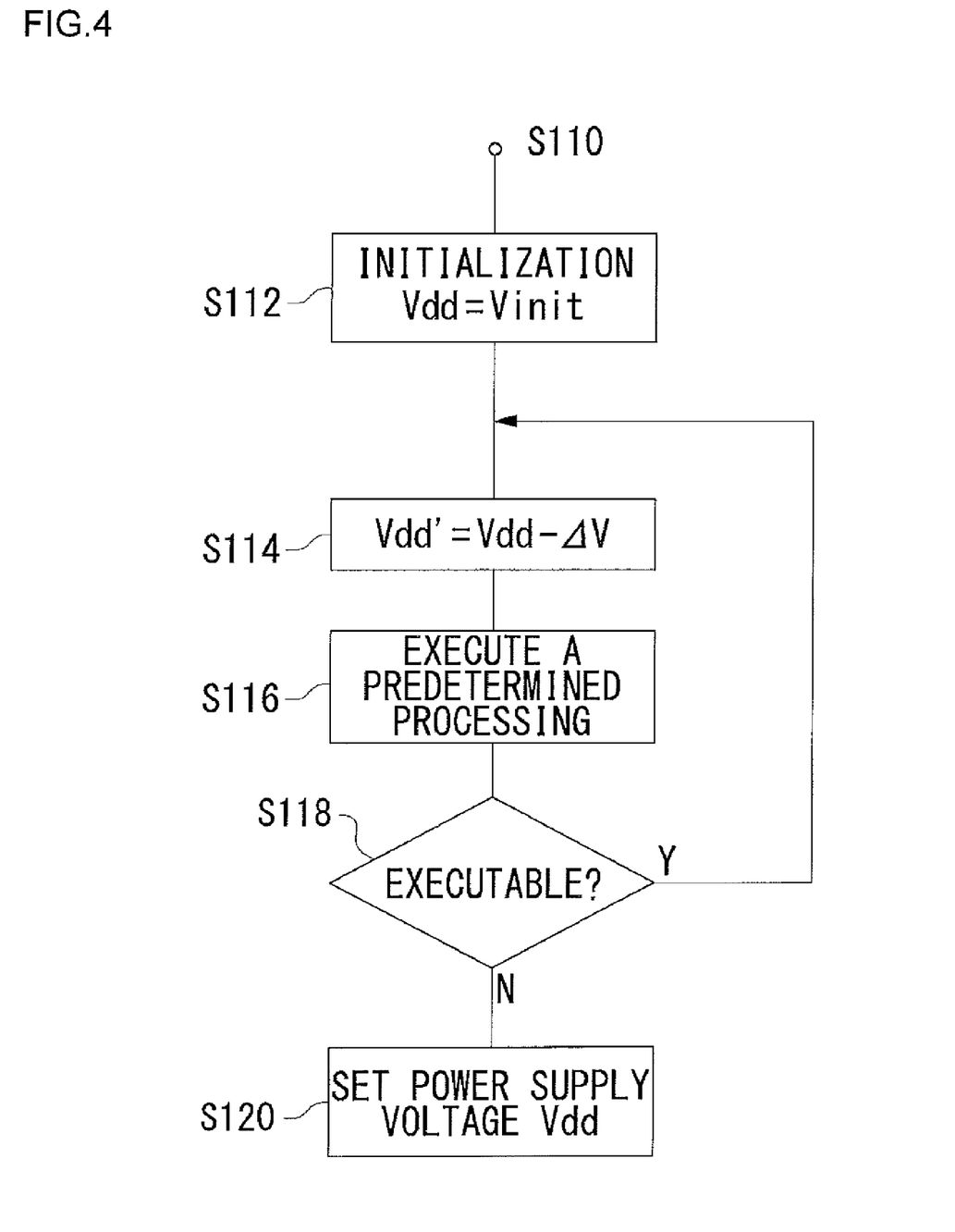
FIG. 4 is a flowchart showing a part of a routine contained in a determination program.

In the determining step S110, a predetermined determination program may be executed using the microprocessor 10. FIG. 4 is a flowchart showing a part of a routine contained in the determination program.

Firstly, in step S112, a predetermined initialization processing is executed. In this initialization processing, the electronic device 1000 is initialized, and also the power supply voltage Vdd is set to an initial value Vinit. It is desirable that the initial value Vinit of the power supply voltage Vdd is a value high enough to allow the microprocessor 10 to reliably execute a predetermined processing which will be described below.

Next, in step S114, the power supply voltage Vdd is lowered by a predetermined value $\Delta V$, and the lowered power supply voltage Vdd' is applied to the microprocessor 10. Then, in step S116, the microprocessor 10 is made to execute a predetermined processing. Then, in step S118, it is determined whether the microprocessor 10 can execute the predetermined processing or not. If it can execute the predetermined processing (Y of S118), a return is made to step S114, where the power supply voltage Vdd is lowered by a predetermined value. If it cannot execute the predetermined processing (N of S118), a voltage near the lower limit for the operation of the microprocessor 10 is set as the power supply voltage (S120). The voltage near the lower limit for the operation of the microprocessor 10 may be a latest power supply voltage Vdd at which the microprocessor 10 could execute the predetermined processing or a voltage with a given margin added to the lower-limit voltage.

When the power supply voltage is lowered gradually, the microprocessor itself may no longer operate at a certain voltage or below, or it can no longer execute the predetermined processing. Hence, by estimating a lower limit voltage at which the microprocessor can still be operated and setting the estimated voltage as the power supply voltage, the power consumption can be reduced because it is no longer necessary to give consideration to the unnecessary margin.

Note that cases may be assumed where as a result of lowering a power supply voltage the microprocessor 10 becomes inoperative and thus the subsequent processing cannot be kept up. To deal with such a case, a service processor, in addition to the microprocessor 10, may be provided to effect a restart by increasing the power supply voltage again.

In an embodiment, an electronic device, equipped with a first processor and a second processor, may be shipped from the factory. For example, the first processor is a main processor, and the second processor is a sub-processor, and they are used for normal operation of the electronic device, in addition to the setting of the power supply voltage. The second processor detects an operating limit voltage which is eventually reached as the power supply voltage is lowered from a predetermined initial value with the first processor operating. Then the power supply voltage for the first processor is set to a value obtained by adding a predetermined margin to the operating limit voltage detected by the second processor.

Note that the predetermined processing to be executed by the determination program preferably includes a processing code that sets a maximum power supply voltage Vdd necessary for the microprocessor 10.

In an LSI, such as the microprocessor 10, there is a path of transistor gates, called a critical path, where the delay is extremely large, and when a processing is done using the gates on this path, the processing capacity of an arithmetic processor is estimated low. Accordingly, it is possible to set the power supply voltage Vdd properly by implementing a processing code using this critical path in the determination program.

The determination program is preferably updatable even after the electronic device 1000 equipped with the microprocessor 10 is shipped from the factory. For instance, an update program may be downloaded by accessing a server on the Internet via the interface unit 130 shown in FIG. 1. Also, the update program may be updated through a disk medium such as CD-ROM or DVD-ROM. In each of the cases, the update function is carried out by the interface unit 130 or the recording unit 120.

(Second Method of Setting)

In the first setting method as described above, an optimum value of power supply voltage Vdd is estimated by having the microprocessor 10 execute a predetermined processing. In contrast to this, in a second setting method to be described below, a characteristic that can be an indicator of the lower limit of operating voltage of the microprocessor 10 is measured first. Then, based on the measured characteristic as the indicator, the lower limit of power supply voltage is estimated and set.

Figure 5:
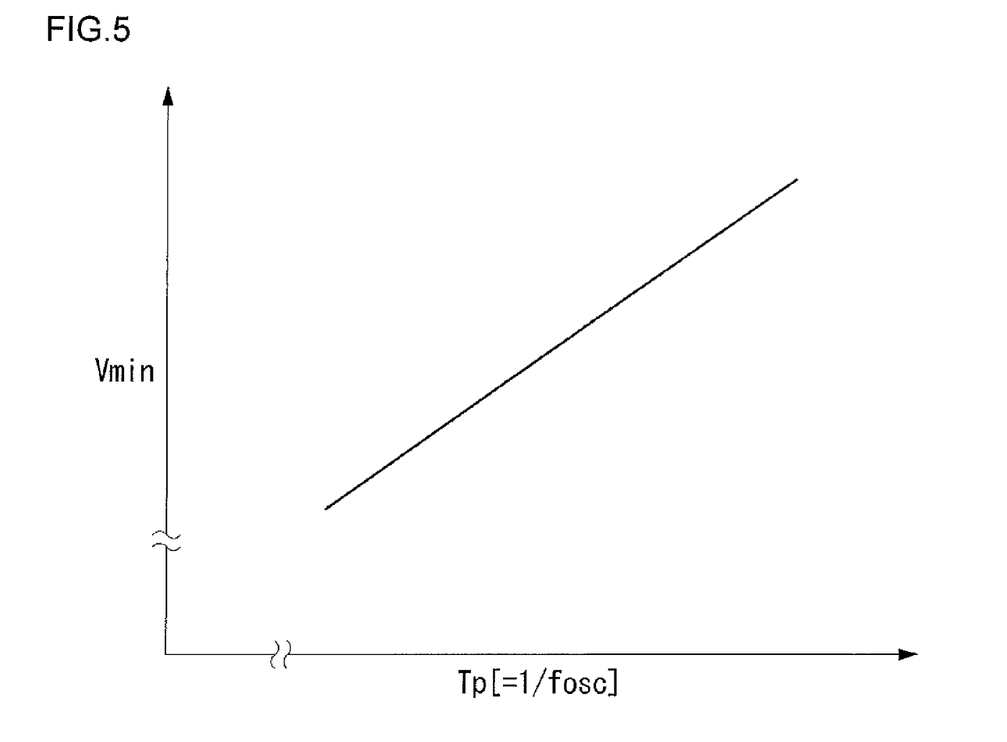
FIG. 5 is a graph showing a relationship between a period Tp of a ring oscillator and a lower limit Vddmin of operating voltage.

The characteristic that can be used as an indicator of the lower limit of operating voltage of the microprocessor 10 is the oscillation frequency of a ring oscillator. FIG. 5 is a graph showing a relationship between a period Tp (reciprocal of oscillation frequency fosc) of a ring oscillator and a lower limit Vddmin of operating voltage, the horizontal axis representing the period Tp of the ring oscillator and the vertical axis the lower limit Vddmin of the operating voltage. As shown in FIG. 5, there is a correlation between the period Tp of the ring oscillator and the lower limit Vddmin; that is, the longer the period Tp of the ring oscillator is, and thus the lower the oscillation frequency fosc is, the higher the lower limit Vmin of power supply voltage will rise.

Figure 6:
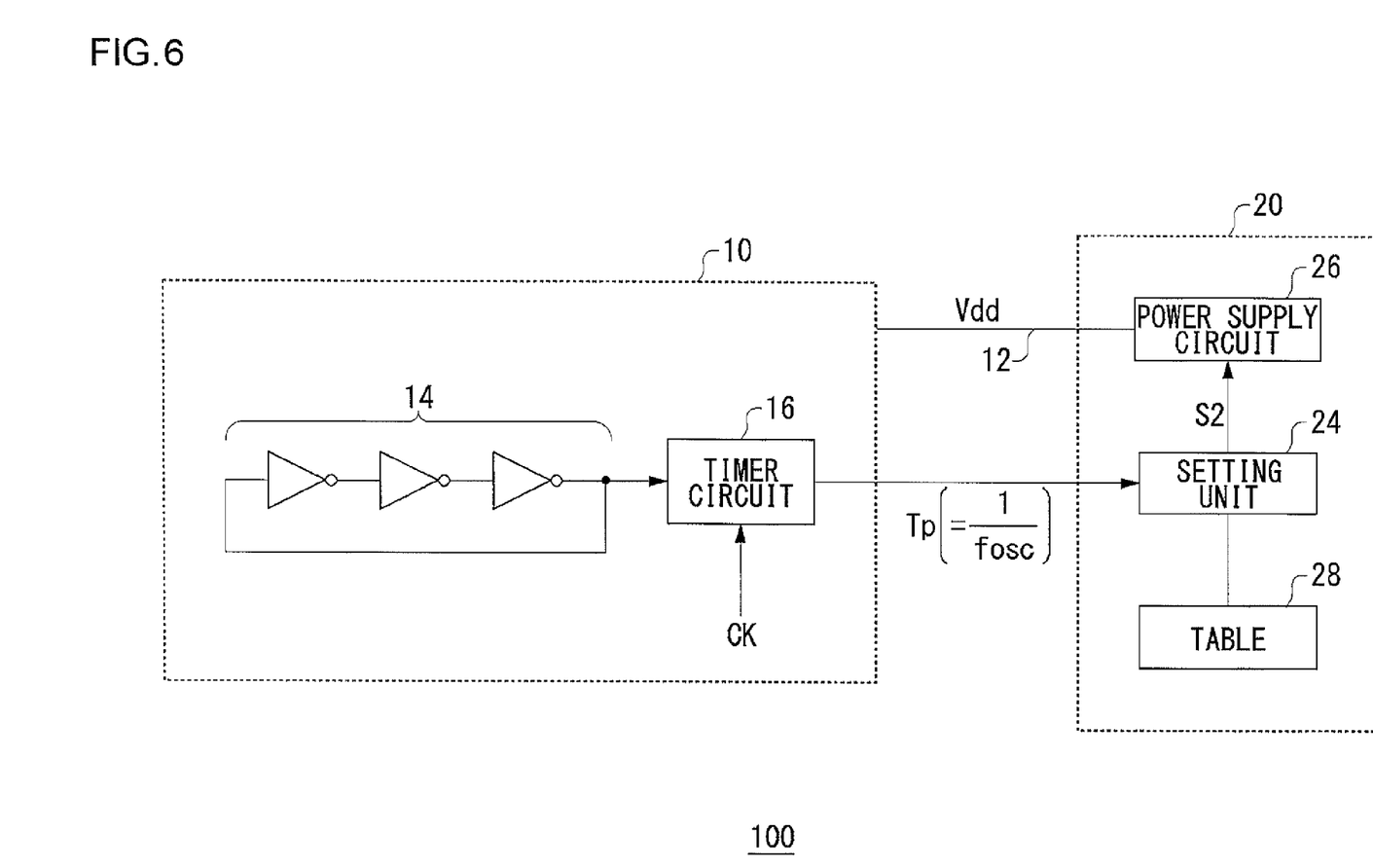
FIG. 6 is a schematic representation of an arithmetic processor according to a second setting method.

Accordingly, in the second setting method, a ring oscillator is provided within the microprocessor 10, and the oscillation frequency fosc thereof is used as the indicator of the lower limit Vmin of the power supply voltage. FIG. 6 is a schematic representation of an arithmetic processor 100 according to the second setting method. A ring oscillator 14 is provided in a microprocessor 10. A timer circuit 16 measures the period (oscillation frequency) of the ring oscillator, using a system clock CK. Preferably, the number of inverters in plural stages constituting the ring oscillator 14 is designed such that the period of the ring oscillator 14 is sufficiently shorter than the period of the system clock CK. The function of the timer circuit 16 may be installed inside the microprocessor 10 itself as shown in FIG. 6 or may be installed outside the microprocessor 10.

The timer circuit 16 reports the measured period Tp of the ring oscillator 14 to the setting unit 24. Based on the reported period Tp, the setting unit 24 sets a power supply voltage Vdd using the correlation of FIG. 5. The arithmetic processor 100 may be provided with a table 28 for associating the measured oscillation frequency (period) with the set value of power supply voltage. Data to be stored in this table 28 can be obtained by carrying out measurements of the correlation of FIG. 5 in advance. The setting unit 24 sets an appropriate power supply voltage Vdd by referring to the table 28 and outputs a control signal S2 representing the set power supply voltage Vdd to the power supply circuit 26. In another exemplary embodiment, the period Tp of the ring oscillator and the power supply voltage Vmin may be held in the form of a calculating formula Vmin=f(Tp), and the power supply voltage may be set based on this calculating formula. Further, this table and the calculating formula are preferably arranged in such a manner that they can be updated.

According to the second method of setting, an optimum power supply voltage Vdd can be set in conformity with individual differences between microprocessors 10. Also, with the same microprocessor 10, the performance of transistor gates therewithin declines due to deterioration with time, so that the oscillation frequency of the ring oscillator 14 may sometimes drop as the ON time gets longer. Therefore, in the second setting method, the setting of power supply voltage taking deterioration with time into consideration can be accomplished.

(Third Method of Setting)

In a third method of setting, a cumulative operating time (POH: Power On Hours) of the microprocessor 10 is measured as the characteristic that can be an indicator of the lower limit of operating voltage of the microprocessor 10. A microprocessor 10 is structured by an integration of innumerable transistor devices called gates. It is known that the level of power supply voltage for stable operation of these transistor devices rises gradually due to deterioration over time such as migration. Conventionally, a method employed has been one of setting a power supply voltage by fixedly adding a voltage margin taking deterioration over time into consideration.

Figure 7:
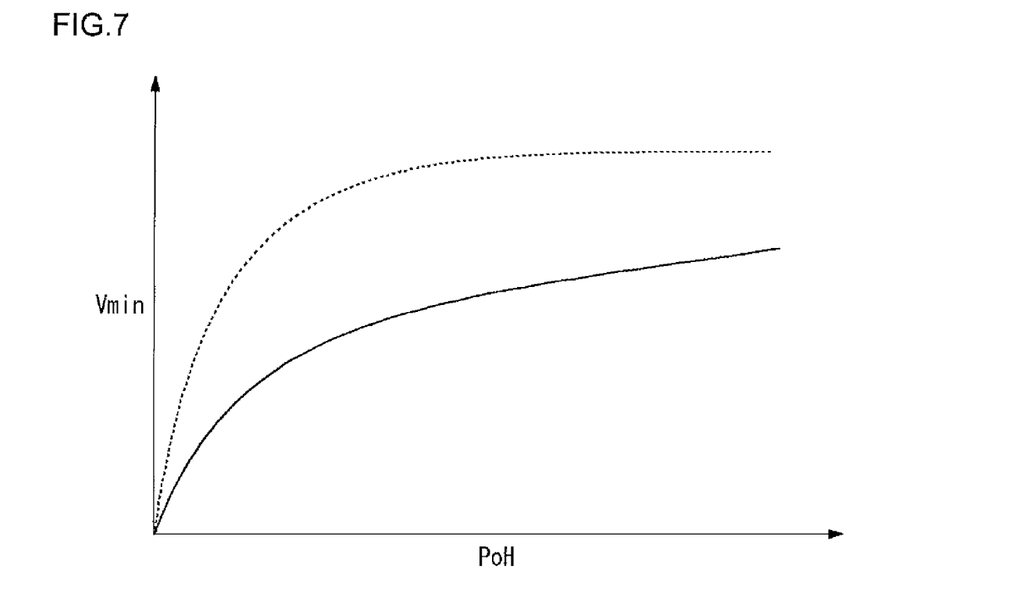
FIG. 7 is a graph showing relations between ON time (POH) and increment ΔV of minimum operating voltage.

In contrast to this, in the third setting method, the ON time (POH) of the microprocessor 10 is measured, and the power supply voltage is raised gradually relative to the deterioration over time. FIG. 7 is a graph showing relations between the ON time (POH) and the increment ΔV of minimum operating voltage in a case where the power supply voltage is set by fixedly adding a predetermined voltage margin according to a conventional method (dotted line) and in a case where the power supply voltage is set in relation to the lapsed time according to the third setting method (solid line).

The ON time (POH) of the microprocessor 10 may be managed by the microprocessor 10 itself or may be managed by a system controller or the like. In any case, a measuring unit for measuring the ON time (POH) may be formed by software or hardware.

If a voltage margin is added fixedly as has been done conventionally, a power supply voltage higher than necessary will be supplied even when the ON time is short, and this will increase power consumption. Also, there is a problem of larger increment ΔV due to accelerated deterioration over time which results from the supply of power supply voltage larger than necessary. In contrast to this, in the third setting method, the increment ΔV shown by the solid line in FIG. 7 is added in stages to the power supply voltage in relation to the ON time (POH). As a result, where the ON time (POH) is short, the power consumption can be reduced because no unnecessary voltage margin is added. Furthermore, the power supply voltage set lower will suppress the deterioration and make the increment ΔV smaller than the level shown by the dotted line. Further, according to the third setting method, the operating voltage lowered than in a conventional method reduces power consumption, which in turn reduces heat generation, thus realizing quieter operation.

The invention has been described based on the exemplary embodiments. The above-described embodiments are intended to be illustrative only and it will be obvious to those skilled in the art that various modifications to any combination of constituting elements and processes could be developed and that such modifications are also within the scope of the present invention.

The several methods of setting power supply voltage explained in the foregoing embodiments may be used individually or in combination.

Also, it may be assumed that there exists some difference between the set value of power supply voltage Vdd specified by the setting unit 24 to the power supply circuit 26 and the power supply voltage Vdd actually supplied to the microprocessor 10, depending on the individual electronic device, due to variations in the impedance of the power supply line 12, the reference voltage within the power supply circuit 26, and the like. Therefore, in the first to third setting methods, the power supply voltage may be set while giving consideration to these variations. For example, an error of a power supply voltage actually applied to the microprocessor 10 from the set value of power supply voltage may be measured with the microprocessor 10 and the power supply unit mounted on a set, and the error may be reflected in the setting of the power supply voltage Vdd by the setting unit 24.

What is claimed is:

1. A method for setting a power supply voltage to be supplied to a microprocessor, the method comprising:
determining a state of the microprocessor; and
setting the power supply voltage according to the state determined by the determining,
wherein the determining and the setting are performed in a state where the microprocessor is mounted on an electronic device on which the microprocessor is finally installed, the determining includes measuring a cumulative operating time of the microprocessor, and the setting sets the power supply voltage according to the cumulative operating time measured by the measuring.

2. A method according to claim 1, wherein the determining is performed repeatedly in predetermined timing, and
wherein whenever the determining is performed, the power supply voltage is reset by the setting.

3. A method according to claim 1, wherein the determining executes a predetermined determination program using the microprocessor, and
wherein the setting is such that the power supply voltage is set based on a result of execution of the determination program in the determining.

4. A method according to claim 3, wherein the determining is such that the power supply voltage supplied to the microprocessor is lowered successively as a predetermined processing is executed by the microprocessor, and
wherein the setting detects a lower limit voltage for an operation of the microprocessor and sets a voltage near the detected lower limit voltage as the power supply voltage, such that the voltage near the detected lower limit voltage is a latest power supply voltage at which the microprocessor could execute the pre determined processing.

5. A method according to claim 3, further comprising updating the determination program after shipment of an electronic device equipped with the microprocessor.

6. A method according to claim 3, wherein the determination program includes a processing code that sets a maximum power supply voltage necessary for the microprocessor.

7. A method according to claim 1, wherein the determining measures a characteristic indicative of a lower limit of operating voltage of the microprocessor, and
wherein the setting sets the power supply voltage according to the measured characteristic indicative thereof.

8. A method according to claim 7, wherein the characteristic indicative thereof is an oscillation frequency of a ring oscillator provided within the microprocessor, and
wherein the setting sets the power supply voltage based on the measured oscillation frequency.

9. An arithmetic processor, comprising:
a microprocessor;
a determining unit which determines a state of the microprocessor;
a setting unit which sets a power supply voltage to be supplied to the microprocessor according to the state of the microprocessor determined by the determining unit; and
a power supply circuit which supplies the power supply voltage set by the setting unit, to the microprocessor,
wherein the determining unit includes a measuring unit which measures a cumulative operating time of the microprocessor as the state of the microprocessor, and the settting unit sets the power supply voltage according to the cumulative operating time measured by the measuring unit.

10. An arithmetic processor according to claim 9, wherein the determining unit determines the state of the microprocessor repeatedly in predetermined timing, and
wherein whenever the determination is performed by the determining unit, the setting unit resets the power supply voltage.

11. An arithmetic processor according to claim 9, wherein the determining unit executes a predetermined determination program using the microprocessor, and
wherein the setting unit sets the power supply voltage based on a result of execution of the determination program.

12. An arithmetic processor according to claim 11, wherein the setting unit and the power supply circuit successively lower the power supply voltage supplied to the microprocessor as a predetermined processing is executed by the microprocessor, and
wherein the setting unit detects a lower limit voltage for an operation of the microprocessor and sets a voltage near the detected lower limit voltage as the power supply voltage such that the voltage near the detected lower limit voltage is a voltage with a given margin added to the detected lower limit voltage.

13. An arithmetic processor according to claim 11, further comprising an updating unit which updates the determination program after shipment of an electronic device equipped with the microprocessor.

14. An arithmetic processor according to claim 11, wherein the determining unit causes the microprocessor to execute the determination program where the determination program includes a processing code that sets a maximum power supply voltage necessary for the microprocessor.

15. An arithmetic processor according to claim 9, wherein the determining unit measures a characteristic indicative of a lower limit of operating voltage of the microprocessor, and
wherein the setting unit sets the power supply voltage according to the measured characteristic indicative thereof.

16. An arithmetic processor according to claim 15, wherein the microprocessor includes a ring oscillator, and
wherein the determining unit includes a frequency measurement unit which measures an oscillation frequency of the ring oscillator as the characteristic indicative of a lower limit of operating voltage, and
wherein the setting unit sets the power supply voltage based on the oscillation frequency measured by the frequency measurement unit.

* * * * *